US010713370B2

(12) United States Patent
Ugale et al.

(10) Patent No.: US 10,713,370 B2
(45) Date of Patent: Jul. 14, 2020

(54) INFORMATION RIGHTS MANAGEMENT THROUGH EDITORS IMPLEMENTED IN A BROWSER

(71) Applicant: Seclore Technology Private Limited, Mumbai (IN)

(72) Inventors: Yogesh Ugale, Mumbai (IN); Hiranya Patel, Mumbai (IN)

(73) Assignee: Seclore Technology Private Limited, Mumbai (IN)

( * ) Notice: Subject to any disclaimer, the term of this patent is extended or adjusted under 35 U.S.C. 154(b) by 0 days.

(21) Appl. No.: 15/679,826

(22) Filed: Aug. 17, 2017

(65) Prior Publication Data

US 2018/0373883 A1   Dec. 27, 2018

(30) Foreign Application Priority Data

Jun. 24, 2017   (IN) .............................. 201721022200

(51) Int. Cl.
| | |
|---|---|
| *G06F 21/00* | (2013.01) |
| *G06F 21/60* | (2013.01) |
| *G06F 21/10* | (2013.01) |
| *G06F 21/12* | (2013.01) |
| *G06F 16/958* | (2019.01) |
| *G06F 16/535* | (2019.01) |

(52) U.S. Cl.
CPC .......... *G06F 21/604* (2013.01); *G06F 16/535* (2019.01); *G06F 16/958* (2019.01); *G06F 21/10* (2013.01); *G06F 21/105* (2013.01); *G06F 21/128* (2013.01)

(58) Field of Classification Search
CPC .. G06F 21/604; G06F 17/3089; G06F 21/105; G06F 21/128; G06F 16/958; G06F 16/535; G06F 21/10
See application file for complete search history.

(56) References Cited

U.S. PATENT DOCUMENTS

| | | | | |
|---|---|---|---|---|
| 8,396,581 | B2 * | 3/2013 | Arduini ................... | G06Q 10/06 700/100 |
| 8,464,148 | B1 * | 6/2013 | Wichary ............. | G06F 17/2247 715/255 |
| 8,694,904 | B2 * | 4/2014 | Verlaan ................. | G06F 40/166 715/770 |
| 2002/0073214 | A1 * | 6/2002 | Iinuma .................... | G06F 21/10 709/229 |
| 2003/0163527 | A1 * | 8/2003 | Hsu ......................... | G09B 7/00 709/204 |

(Continued)

*Primary Examiner* — Ghodrat Jamshidi
(74) *Attorney, Agent, or Firm* — Preston Smirman; Smirman IP Law, PLLC (57) ABSTRACT

A system and method is described for implementing or managing IRM controls over digital content through a browser. The computer implementing or managing IRM controls over digital content through a browser includes at least one user device and a server. The user device includes a browser, the server comprises a database to store a plurality of IRM rights data and corresponding user permission, an identifier module to identify the user, an editor module to allow the user to view, edit, copy, paste and print the digital content based on the user permission defined for any respective protected document within the user device or downloaded through the Internet.

1 Claim, 6 Drawing Sheets

(56) References Cited

U.S. PATENT DOCUMENTS

| | | | |
|---|---|---|---|
| 2006/0168125 A1* | 7/2006 | Leo Spork | G06F 16/986 |
| | | | 709/219 |
| 2008/0225057 A1* | 9/2008 | Hertzfeld | G06F 16/583 |
| | | | 345/619 |
| 2008/0301713 A1* | 12/2008 | Demarest | G06Q 10/10 |
| | | | 719/317 |
| 2010/0083097 A1* | 4/2010 | Katz | G06F 16/986 |
| | | | 715/234 |
| 2013/0174272 A1* | 7/2013 | Chevalier | G06F 21/10 |
| | | | 726/28 |
| 2014/0129920 A1* | 5/2014 | Sheretov | G06F 17/30873 |
| | | | 715/234 |
| 2014/0304836 A1* | 10/2014 | Velamoor | G06F 21/6209 |
| | | | 726/28 |
| 2017/0004291 A1* | 1/2017 | Pathak | G06F 21/10 |
| 2017/0078721 A1* | 3/2017 | Brockmann | H04N 21/8456 |
| 2017/0124342 A1* | 5/2017 | Panchapakesan | G06F 21/6209 |
| 2017/0270283 A1* | 9/2017 | Shiraishi | G06F 21/10 |
| 2017/0286711 A1* | 10/2017 | Negrea | H04L 63/10 |
| 2017/0371926 A1* | 12/2017 | Shiran | G06F 17/30433 |
| 2018/0157467 A1* | 6/2018 | Stachura | G06F 8/30 |
| 2019/0195644 A1* | 6/2019 | Scheufler | G06F 21/604 |

\* cited by examiner

“INFORMATION RIGHTS MANAGEMENT THROUGH EDITORS IMPLEMENTED IN A BROWSER

CROSS-REFERENCE TO RELATED APPLICATION

The instant application claims priority to Indian Patent Application Serial No. 201721022200, filed Jun. 24, 2017, pending, the entire specification of which is expressly incorporated herein by reference.

FIELD OF THE INVENTION

The present invention relates to a system for managing information right management (IRM) controls and pre-defined rights upon any digital content. More specifically, the system for managing IRM controls and predefined rights upon any digital content through editors is implemented in a browser.

BACKGROUND OF THE INVENTION

Information right management systems in present market ecology or consumer domain support the specific needs to keep data dissimilation limited and confidential to only those who are actually meant to use it. These systems are typically designed to provide high levels of data security and its continued protection as per the policies in place. There is access permissions defined for the information that allows identified users a level of access on any particular information that they are authorized to view, edit or forward. However, in conventional IRM controls for managing access permission, the user has to install dedicated services, device drivers, plugins in the standard editor or viewer software or providing replacement application to handle editing or viewing of the documents or files. Installing these components often interferes with others components of the system e.g. antivirus software, firewalls, standard editors and viewers.

This can essentially make these software components and conventional IRM controls to work in conflicting manner. It may also cause parts of system or device operations to not work as transparently as they were doing before. Further, there can be restrictions imposed by operating systems or limitations that may prevent installing or copying such software/components on the system or device altogether.

Therefore, to eliminate the limitations/drawbacks listed above within the conventional system, the present invention proposes a system and a method to overcome the above limitations.

SUMMARY OF THE INVENTION

The objects of present disclosure are aimed at ameliorating one or more problems of the prior art or to at least provide useful alternatives as listed herein below.

An object of the present disclosure is to provide a computer implemented system for enforcing and/or managing IRM capabilities upon digital content through a browser.

Another object of the present disclosure is to provide a computer implemented system for enforcing and/or managing IRM capabilities upon digital content through a browser that is device independent.

Yet another object of the present disclosure is to provide a computer implemented system for enforcing and/or managing IRM capabilities upon digital content through a browser that doesn't require installation of dedicated software on the respective device or system.

Other objects and advantages of the present disclosure will be more apparent from the following description when read in conjunction with the accompanying figures that are not intended to limit the scope of the present disclosure.

A computer implemented system for enforcing and/or managing IRM capabilities upon digital content through a browser. The system comprises a protected file or digital media, any device that has a browser installed within it, and an identified user. The user may, through various means, including but not limited to, local storage or shared through removable device, any Internet enable data input means like emails or DMS (document management system), i.e., SHAREPOINT or FILENET, and/or any EFSS (enterprise file sync and share), i.e., DROPBOX, BOX or ONEDRIVE, may open files or digital media within any device having a browser installed within it. The browser would then interact with such protected or unprotected document and would run a webpage within the browser having code to access the document contents and would have further capabilities to enforce IRM capabilities over such protected documents or digital media. The process of enforcing the IRM controls can be performed through the codes running within the browser or through the webpage's interaction with a server having predetermined set of policies and authentication data. The IRM in a browser will allow consuming protected or unprotected document, online or offline in the browser without need to install any other software on the system other than the browser.

In an embodiment, the user device is connected to the server over the World Wide Web network.

In an embodiment, the IRM controls may be implemented over any digital content through a browser from different modes consisting of a browser, a modified browser, a plugin in browser, a script running on a browser, an embedded browser control, any embeddable control like Active X, JAVA Applet or FLASH and remote screen replication within a browser.

In an embodiment, the web application is selected from a group consisting of a browser, a modified browser, a plugin in a browser, a script running on a browser, an embedded browser control, and a remote screen replication in a browser.

In an embodiment, a method for managing and/or enforcing IRM controls upon digital content through a browser without need to install any other software component in the system, comprises:
 identification of the user;
 checking the IRM rights corresponding to the identified user;
 allowing the user to view, edit, copy, paste and print the digital content based on the permission;
 auditing the user activities; and
 updating and storing the digital content.

BRIEF DESCRIPTION OF THE DRAWINGS

The computer implemented steganography system of the present disclosure will now be described with the help of the accompanying drawing, in which.

DETAILED DESCRIPTION OF THE INVENTION

As used in the present disclosure, the following terms are generally intended to have the meaning as set forth below, except to the extent that the context in which they are used, indicate otherwise.

The expression "application/app" used hereinafter in this specification refers to, but is not limited to, a software program that runs independently on a computing machine.

The expression "browser" used hereinafter in this specification refers to, but is not limited to, an Internet browser that acts as independent app or application or a browser control that can be embedded in other applications or apps.

The expression "editor-viewer" used hereinafter in this specification refers to, but is not limited to software, and may include any software that understands structure, encoding, instructions, script as part of a document and render visual presentation along with behavior expected, optionally allow modifying contents and behavior through process of editing or scripting or automation and allow storing edited form in memory, on disk or transmission to any recipient or system or location by any means intermittent.

The expression "install" used hereinafter in this specification refers to, but is not limited to copying or making available binaries or any intermediate form or script that may run on a runtime or physical hardware or virtual machine, stored temporarily or in persistent manner on a physical or virtual system through process of installer or package manager or installation script or any kind of installer application or online app store or accessing through remoting where user interaction is sent to other application and this application's UI is duplicated at a user's end.

The expression "IRM software" used hereinafter in this specification refers to, but is not limited to any software that can run as an independent application or embedded inside another application, or device driver software, or a library, or service, or component, or a plugin inside other software, or a script running on a kind of virtual machine or interpreter, or JAVASCRIPT or any other script running inside a browser directly or through its plugins, or a browser plugin, that could be running in any form, and delivers IRM capabilities.

The expression "IRM capabilities" used hereinafter in this specification refers to, but is not limited to, ability to protect a document or file in any form and assigning rights of any kind for restricting its usage later, ability to use protected document or file in a controlled manner defined by restrictions or rights, ability to distribute protected document or file to others with rights assigned, and ability to unprotect document or a file, assign or transfer ownership.

The expression "protected document" used hereinafter in this specification refers to, but is not limited to, document(s)/file(s) upon which IRM controls are implemented and/or managed.

The expression "user device" used hereinafter in this specification refers to, but is not limited to, any device having processing capability such as mobile phone, tab, PDA, desktop, laptop, IPHONE, IPAD and the like. The user device may include any kind of computer including physical or virtual, any kind of mobile device including physical or virtual, working as standalone or embedded in other system.

Conventional information right management systems are used to support a specific organization's needs. These systems are typically designed to provide high levels of transaction performance and data security. The information right management systems protect the information contained within the document(s)/file(s). There are access permissions defined for such documents or digital media that allows identified users a level of access on the information contained therein. However, for implementing or managing access permission, the user has to install dedicated software components in the form of services, applications, device drivers, plugins in the standard editor or viewer software or providing replacement application to handle editing or viewing of the documents or files, in conventional IRM controls. Installing these components often interferes with others parts of the system e.g. antivirus software, firewalls, standard editors and viewers.

This may essentially make these software components or conventional IRM controls to have conflicting features resulting in them to work in an improper manner. It may also cause parts of system or device operations to not work as transparently as they were doing before. Further, there can be restrictions imposed by operating systems or limitations that may prevent installing or copying such software/components on the system or device.

Therefore, to eliminate the limitations/drawbacks listed above of the conventional system, the present invention proposes a system and a method to overcome the above limitations.

Figure 1:
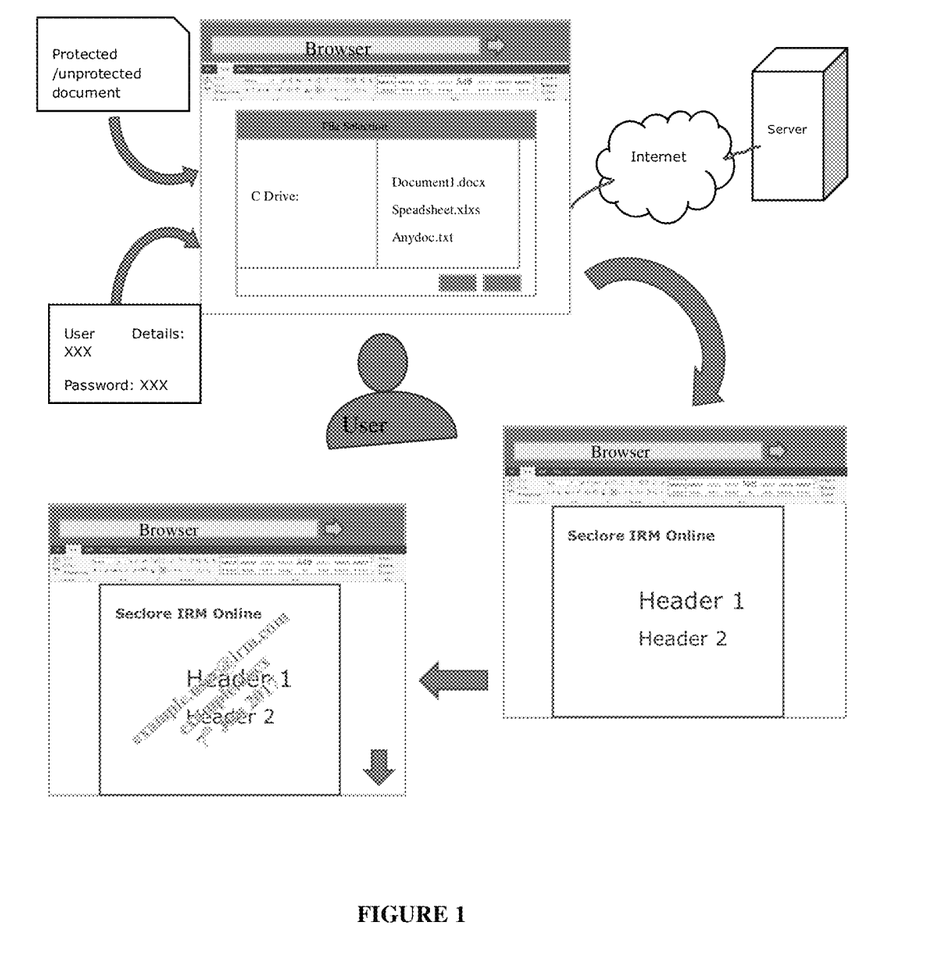
FIG. 1 to FIG. 6 illustrate different working embodiments of the system for implementing, enforcing and/or managing IRM capabilities upon digital content through a browser, in accordance with the general teachings of the present invention.

The present disclosure envisages a computer implemented system for enforcing and/or managing IRM capabilities over digital content through a browser without installation of any client or software component on user device. FIG. 1 illustrates a diagram of the system for implementing, enforcing and/or managing IRM capabilities upon any protected or unprotected document or digital media through a browser. The computer implemented system for enforcing and/or managing IRM capabilities over any digital media through a browser comprises at least one user device and a server. The user device comprises a browser and it is configured to access the server. The user using the browser can view, edit, copy, paste or print the protected document based on the granted permission that would even involve unprotecting a protected document. In an embodiment, the browser is connected to the server over a World Wide Web network. In an embodiment, the browser is selected from a group consisting of a browser, a modified browser, a plugin in browser, a script running on a browser, an embedded browser control, and a remote screen replication through a browser. FIG. 1 comprises the following members:

Protected document (1): The user (2) may have a file or digital content having specific IRM rights assigned to him, that may be accessed through various means including but not limited to local storage or shared through removable media, any Internet enable data input means like emails or DMS (document management system), i.e., SHAREPOINT or FILENET and or any EFSS (enterprise file sync and share), i.e., DROPBOX, BOX or ONEDRIVE may open files or digital media within any device having a browser installed within it.

User (2): The web page running within the browser would require user authentication to allow access for the data contained within the document, the modes of authentication may be through various means, like online through a server or offline modes like device integrated or OS integrated authentication.

Browser (3): The protected document will be opened in the browser to interpret IRM rights assigned for the document and render the contents within predefined controls. The system makes a point that there is some mechanism to check user permissions to use the specific protected documents.

At the server, permissions are checked for the identified user and specific document.

Another variation to this is verification of user's permissions to use the document is verified inside the browser.

Whereas, in case of an unprotected document, the user may enforce or implement IRM capabilities and define the permitted access or restrictions over the document.

Server (4): The protected document may be sent by the browser to a remote server for verification of the existing IRM rights imposed on the document.

The present invention enables the browser to upload the protected document having IRM rights on a server for checking the user's pre-defined permissions on the document.

The variation to this is a protected document would carry its permissions along as part of it or separately, whatever the case may be, and these permissions are sent to the server for verification.

Another variation to this is, unique reference of the protected document is sent to the server for checking the pre-defined permissions pertaining to the user.

IRM enabled editors (5): based on the document to be used and activities allowed to be used by the user then, a document editor or viewer that understands rendering of the document is launched inside the browser as a part of the Web application. The editor or viewer launched inside the browser has IRM controls implemented that enforces restriction on use of the document in certain manner. IRM Controls include, but are not limited to, enforcing rights to view, edit, print, share and further providing watermark identifying the user's identity, unprotect document, protect unprotected document and records user's activity on the document while in use.

Figure 2:
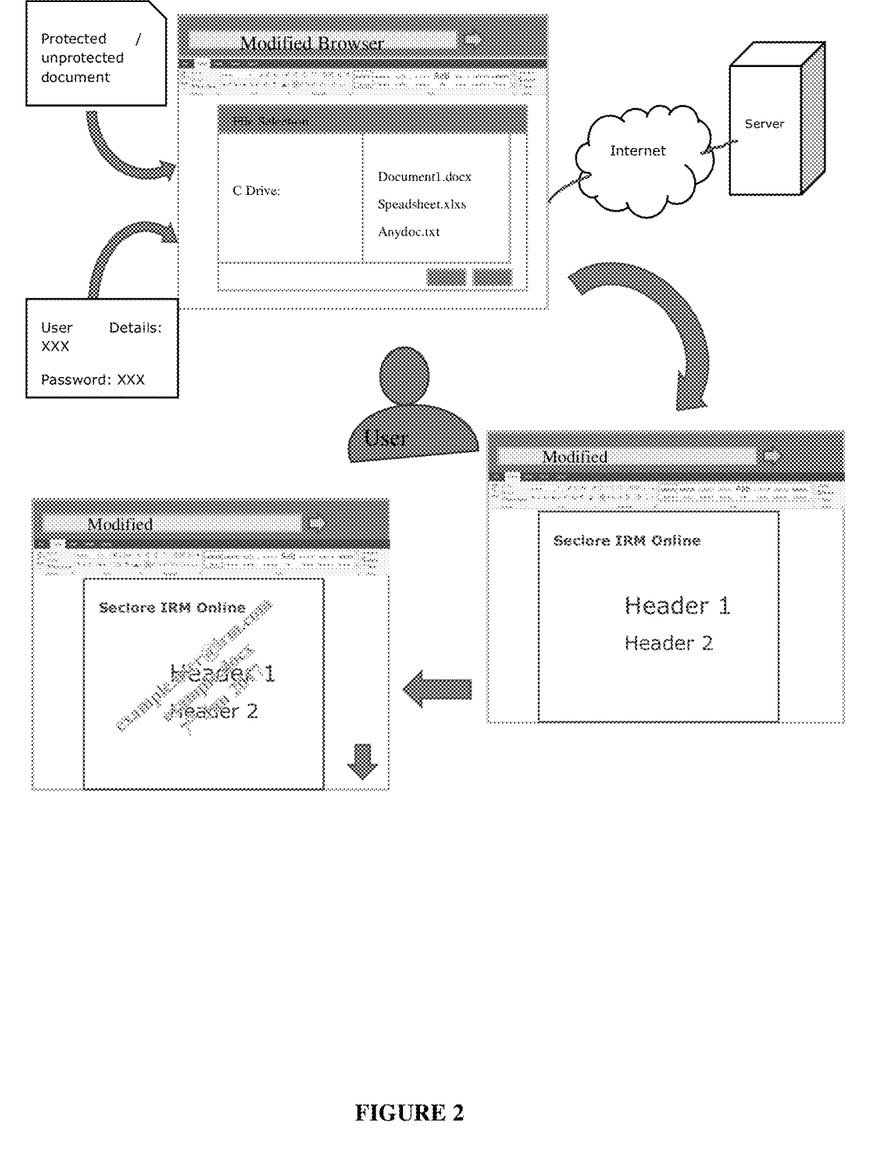

FIG. 2 illustrates further wherein the invention can be operated through a modified browser to implement editor or viewer with IRM controls as part of the added browser capabilities. Further the invention can also enable the use of the browser with inbuilt implementation of editor or viewer with IRM controls. Based on document to be used and activities allowed to be used by the user then, a document editor or viewer that understands rendering of the document is launched inside the browser that is built in completely or partially.

Figure 3:
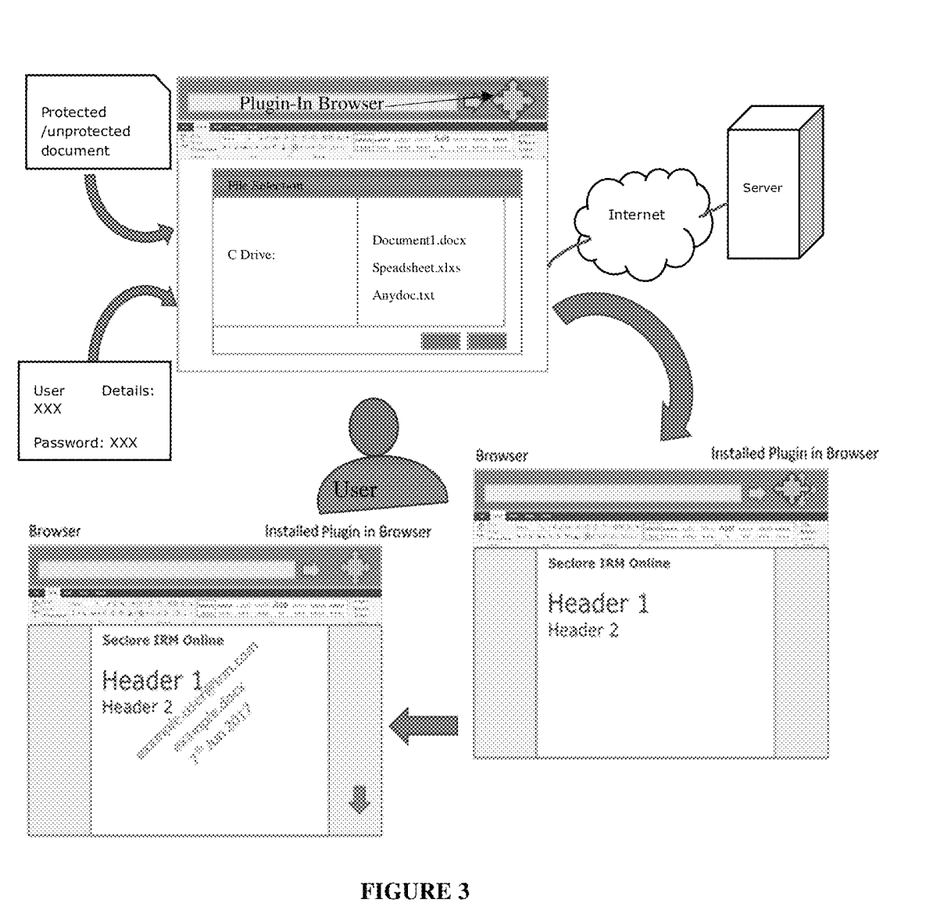

FIG. 3 illustrates the process where the invention uses a browser plugin to extend the browser's capabilities to implement editor or viewer with IRM controls inside the browser.

Figure 4:
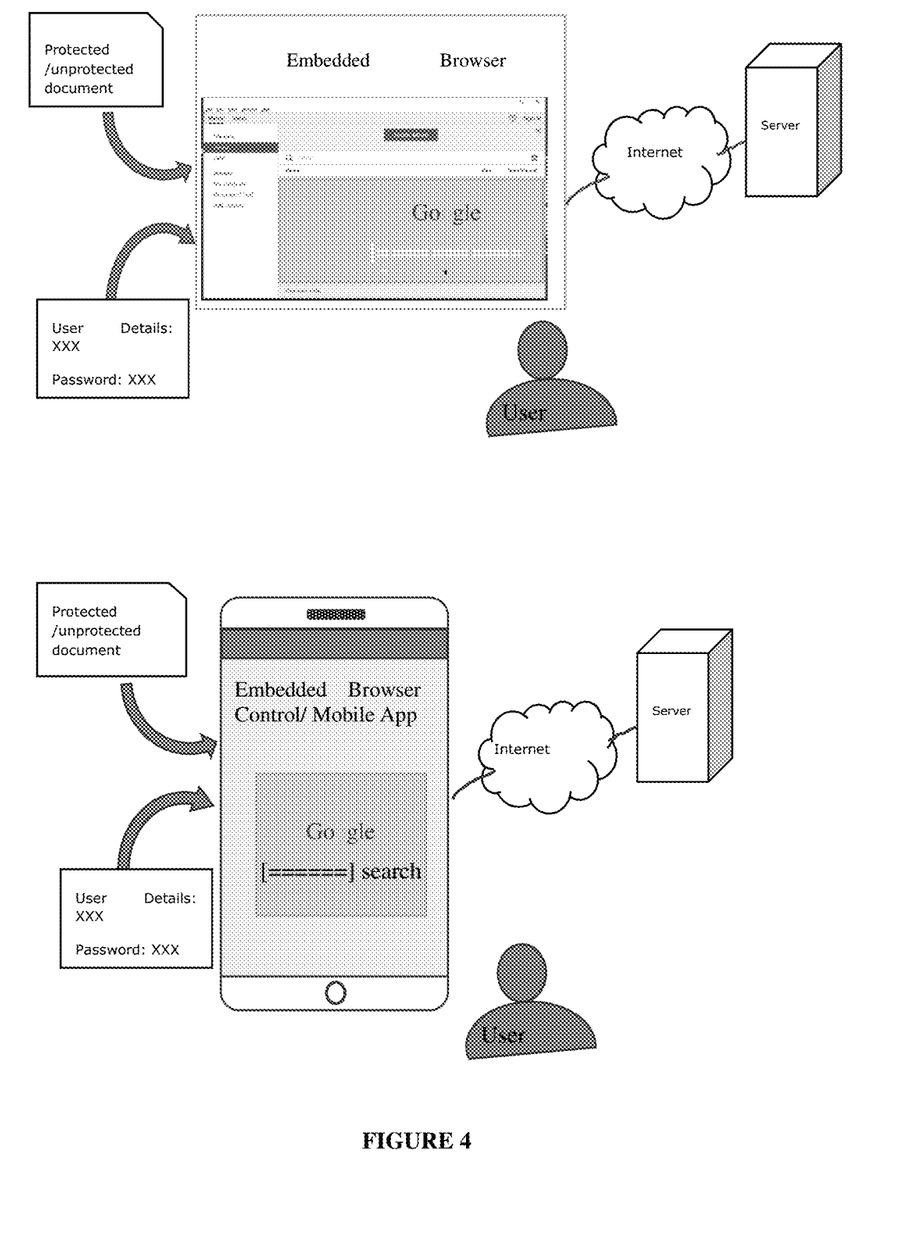

FIG. 4 illustrates the implementation IRM controls through the present invention wherein the browser is not used as standalone method but is rather used in tandem with an application or app, wherein it has a standard application or app that has embedded browser control used.

Figure 5:
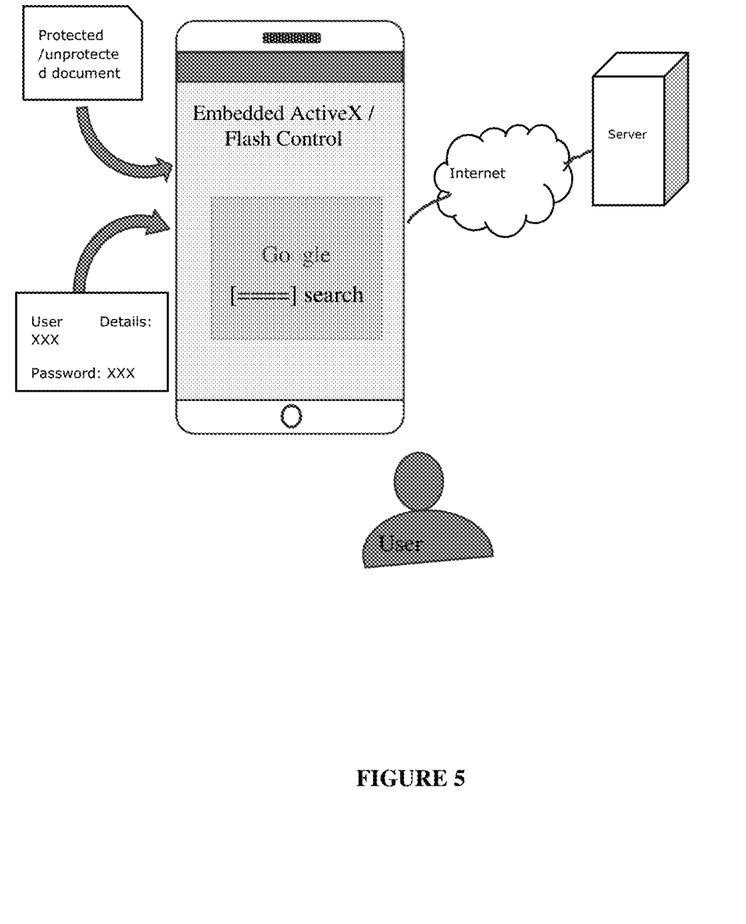

FIG. 5 illustrates the application of the present invention through and embeddable component that can understand and render HTML or XML and could run any kind of script or code. The component itself does not need to be a browser control. Instead it may be an ActiveX component or a FLASH component or a JAVA Applet that can be embedded and run inside the browser or inside a standalone application or app other than the browser itself. In a way, the control behaves like a browser without being dedicated for browser only use.

Figure 6:
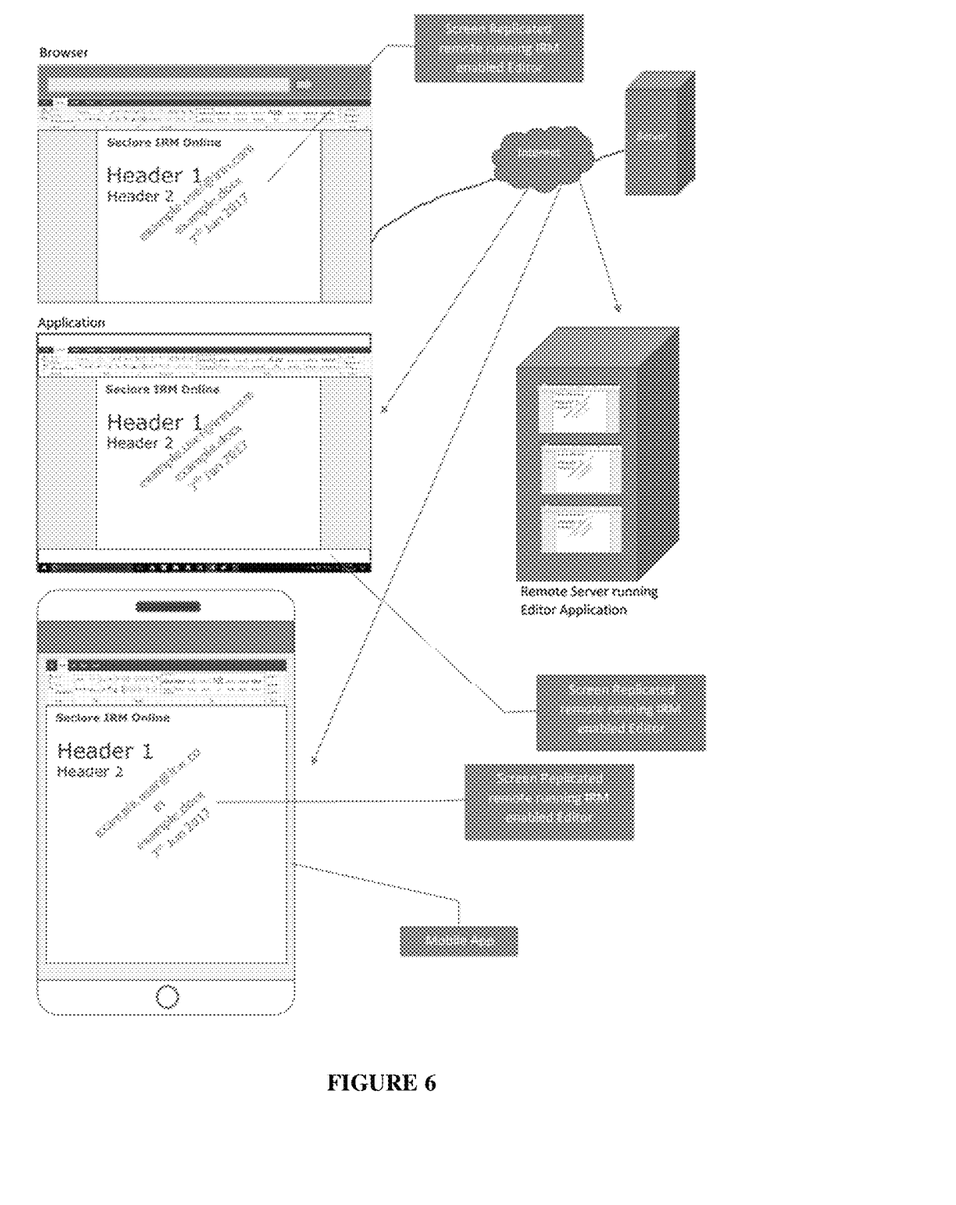

FIG. 6 illustrates further wherein it does not implements editor or viewer functionality directly. Instead, the editor or viewer is launched in a remote environment on the server accessible through the network. The editor or viewer UI is replicated on the client side and user inputs are sent to the remote running instance. The IRM capabilities are implemented or enforced directly on the client side or manages controls what can be done at the client side. The client may be a browser or an application or an app performing near real-time screen replication and marshalling user interaction back to the remote instance of the editor or viewer. Based on document to be used and activities allowed to be used by the user then, a document editor or viewer that understands rendering of the document is launched on a remote server as a jailed application or a virtual application or as thin client application. UI produced by the remote application is replicated in the browser. The user's interactions are sent to the remote application to which remote application responds. This is virtualization as if the editor or viewer is running inside the browser without need to install any software component on the user's system or device.

In some applications, the present invention described above may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device or system. Examples of a computing device or system may include, but are not limited to, an electronic book reading device, a computer workstation, a terminal computer, a server computer, a handheld or mobile device (e.g., a tablet computer, a personal digital assistant "PDA", a mobile telephone, a Smartphone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

As used herein, the term "mobile device" is intended to encompass any form of programmable computing device as may exist, or will be developed in the future, that implements a communication module for wireless voice and data communications, including, for example, cellular telephones, personal data assistants (PDA's), palm-top computers, laptop, and notebook computers, wireless electronic mail receivers (e.g., the BLACKBERRY™ and TREO™ devices), multimedia Internet enabled cellular telephones (e.g., the BLACKBERRY STORM™, and similar personal electronic devices that include a wireless communication module, processor and memory.

The computer device or system may also include an input device. In one example, a user of the computer device or system may enter commands and/or other information into computer device or system via an input device. Examples of an input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device or system via a storage device (e.g., a removable disk drive, a flash drive, etc.) and/or a network interface device. A network interface device, such as network interface device may be utilized for connecting the computer device or system to one or more of a variety of networks and/or one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from the computer device or system via a network interface device.

The computer device or system may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device or system may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

The technical advancements of the system and method envisaged by the present disclosure include the realization of:

a computer implemented system for implementing or managing IRM controls digital content through a browser.

a computer implemented system for managing digital content over a browser that is device independent.

a computer implemented system for managing digital content through a browser that doesn't require installation of dedicated software for managing digital content on the user's device.

The disclosure has been described with reference to the accompanying embodiments that do not limit the scope and ambit of the disclosure. The description provided is purely by way of example and illustration.

The embodiments herein above and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification, the word "comprise", or variations such as "comprises" or "comprising," will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification, specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A computer implemented system for enforcing or managing information right management (IRM) capability, comprising:
    at least one user device, wherein the user device is a wireless telecommunications device, comprising:
        a browser having an editor module, wherein the editor module includes IRM capabilities configured to view digital content, edit the digital content, print the digital content, share the digital content and watermark a user's identity, unprotect the digital content if protected, protect the digital content if unprotected and record the user's activity on the digital content corresponding to a user permission; and
    a server, comprising:
        a database to store a plurality of IRM rights data and corresponding user permissions;
        an identifier system to identify the user;
        an editor module control software to allow the user to view, edit, copy, paste and print the digital content based on the user permissions defined for any protected document within the user device or downloaded through the Internet;
        a delivery system to deliver to the editor module of the browser IRM capabilities corresponding to the user permission within the browser;
    wherein, when the user edits the digital content, the edited digital content is uploaded to and stored in a data storage system;
    wherein the IRM capabilities are enforced through any one of a browser, a modified browser, a plugin in browser, a script running on a browser, an embedded browser control, and a remote screen replication;
    wherein the user device is connected to the server over a network.

* * * * *